United States Patent [19]

Streusand

[11] Patent Number: 4,585,822

[45] Date of Patent: Apr. 29, 1986

[54] THERMALLY CONDUCTIVE ROOM TEMPERATURE VULCANIZABLE COMPOSITIONS

[75] Inventor: Marie J. Streusand, Saline, Mich.

[73] Assignee: SWS Silicones Corporation, Adrian, Mich.

[21] Appl. No.: 665,469

[22] Filed: Oct. 29, 1984

[51] Int. Cl.$^4$ .............................................. C08K 3/28
[52] U.S. Cl. .................. 524/443; 524/588; 524/789
[58] Field of Search ................. 524/443, 588, 789

[56] References Cited

U.S. PATENT DOCUMENTS

| | | | |
|---|---|---|---|
| 3,070,559 | 12/1962 | Nitzsche et al. | 524/588 |
| 3,499,856 | 3/1970 | Funatsu et al. | 524/238 |
| 3,499,859 | 3/1970 | Matherly | 524/701 |
| 3,642,692 | 2/1972 | Hartlage | 524/588 |
| 3,836,489 | 9/1974 | Bargain | 524/588 |
| 4,024,933 | 5/1977 | Hinderks | 188/77 R |
| 4,123,472 | 10/1978 | Getson et al. | 525/451 |
| 4,292,225 | 9/1981 | Theodore et al. | 524/188 |
| 4,419,650 | 12/1983 | John | 423/445 |

FOREIGN PATENT DOCUMENTS

| | | | |
|---|---|---|---|
| 55-71677 | 5/1980 | Japan | 524/443 |
| 56-161461 | 12/1981 | Japan | 524/789 |

Primary Examiner—Lewis T. Jacobs

[57] ABSTRACT

This invention relates to thermally conductive room temperature vulcanizable organopolysiloxane compositions containing hydroxyl-terminated organopolysiloxanes, a crosslinking agent selected from polyalkoxysilanes and polyalkoxysiloxanes, a condensation catalyst and from 30 to 95 percent by weight of filler based on the weight of the composition, of which at least 10 percent by weight of the filler is silicon nitride particles.

11 Claims, No Drawings

THERMALLY CONDUCTIVE ROOM TEMPERATURE VULCANIZABLE COMPOSITIONS

The present invention relates to room temperature vulcanizable organopolysiloxane compositions and more particularly to thermally conductive room temperature vulcanizable organopolysiloxane compositions.

BACKGROUND OF THE INVENTION

Inorganic particulate materials have been incorporated in organopolysiloxane compositions to impart certain properties to the resultant elastomers. For example, boron nitride has been incorporated in organopolysiloxane compositions to provide silicone elastomers which resist degradation when exposed to elevated temperatures. Likewise, boron nitride has been incorporated in organopolysiloxane compositions to enhance the thermal conductivity of the resultant elastomers. This is particularly important since in certain electrical applications, the electrical components generate enough heat to cause a change in the resistance of the electrical components which often causes the electrical circuit to function in an abnormal manner. Therefore, it would be desirable to have an insulating material which can be applied to electrical components and readily conducts heat away from these components. Also, it would be desirable to have an insulating material having improved physical properties as well as increased filler loadings, thereby reducing the material costs.

Filler materials, such as boron nitride have been incorporated in two-component, thermally conductive room temperature vulcanizable compositions. For example, U.S. Pat. No. 3,499,859 to Matherly describes a two-component organopolysiloxane composition containing boron nitride as the primary filler. Also, U.S. Pat. No. 4,292,225 to Theodore et al describes a highly filled two-component composition containing an organopolysiloxane, a boron refractory powder and silica.

Room temperature vulcanizable organopolysiloxane compositions containing various fillers are also described in U.S. Pat. No. 2,843,555 to Berridge and U.S. Pat. No. 3,127,363 to Nitzsche et al. Neither of these patents, however, disclose thermally conductive elastomers containing fillers such as contemplated herein.

It has unexpectedly been found that silicon nitride particles can be incorporated in room temperature vulcanizable organopolysiloxane compositions in increased loadings to form silicone elastomers having improved physical properties and thermal conductivity.

Therefore, it is an object of this invention to provide a thermally conductive room temperature vulcanizable organopolysiloxane composition. Another object of this invention is to provide a highly filled room temperature vulcanizable organopolysiloxane composition which forms an elastomer having desirable physical properties and thermal properties. Still another object of this invention is to provide silicone elastomers having superior thermal conductive properties. A further object of this invention is to provide a two-component organopolysiloxane which vulcanizes at room temperature to form a silicone elastomer having superior thermal conductive properties.

SUMMARY OF THE INVENTION

The foregoing objects and others, which will become apparent from the following description are accomplished in accordance with this invention, generally speaking, by providing a thermally conductive room temperature vulcanizable organopolysiloxane composition containing a hydroxyl-terminated organopolysiloxane, a crosslinking agent selected from the group consisting of polyalkoxysilanes and polyalkoxysiloxanes, a condensation catalyst and from 30 to 95 percent by weight of filler based on the weight of the composition of which at least 10 percent by weight of the filler is silicon nitride particles.

DESCRIPTION OF THE INVENTION

The hydroxyl-terminated organopolysiloxane may be represented by the general formula

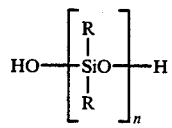

where R, which may be the same or different is a monovalent hydrocarbon radical or a halogenated monovalent hydrocarbon radical having from 1 to 18 carbon atoms and n is a number such that the viscosity ranges from about 5 to 300,000 mPa.s at 25° C.

Generally, these organopolysiloxanes have from about 1.8 to about 2.25 organic groups per silicon atom and more preferably from about 1.9 to about 2.1 organic groups per silicon atom.

Even though the organopolysiloxanes are generally linear polymers having diorganosiloxane units ($R_2SiO$), they may also contain up to about 2 mole percent of other units such as $RSiO_{3/2}$, $R_3SiO_{0.5}$ and/or $SiO_{4/2}$ units, in which R is the same as above. These organopolysiloxanes preferably have a viscosity of from about 5 to 300,000 mPa.s at 25° C. and more preferably a viscosity of from about 500 to 100,000 mPa.s at 25° C.

These hydroxyl-terminated organopolysiloxane polymers and methods for preparing the same are described, for example, in U.S. Pat. No. 2,607,792 to Warrick and U.S. Pat. No. 2,843,555 to Berridge.

Examples of monovalent hydrocarbon radicals represented by R above are alkyl radicals, such as the methyl, ethyl, propyl, butyl, hexyl, octyl, decyl and octadecyl radicals; aryl radicals such as the phenyl and naphthyl radicals; alkenyl radicals such as the vinyl and allyl radicals; aralkyl radicals such as the benzyl and phenylethyl, phenyl-propyl and phenylbutyl radicals; alkaryl radicals such as tolyl, xylyl and ethylphenyl radicals and cycloalkyl radicals such as cyclopropyl, cyclobutyl and cyclohexyl radicals. Examples of halogenated monovalent hydrocarbon radicals are halogenated derivatives of the foregoing radicals such as the 3,3,3-trifluoropropyl radical and chlorophenyl radicals.

The hydroxyl-terminated organopolysiloxanes are cross-linked by the addition of polyalkoxysilanes of the formula

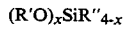

or polyalkoxysiloxanes in which the silicon atoms are linked through =Si-O-Si= linkages and the remaining valences of the silicon atoms are satisfied by (R'O) and R" radicals and condensation catalysts. In the above formula R' is a monovalent hydrocarbon radical having from 1 to 8 carbon atoms and R" is a monovalent hydrocarbon radical or a halogenated monovalent hydrocarbon radical having from 1 to 8 carbon atoms and x is 3 or 4.

Examples of monovalent hydrocarbon radicals represented by R' are methyl, ethyl, propyl, butyl, hexyl, octyl, phenyl, vinyl, allyl, ethylallyl, butadienyl and the like. Radicals represented by R" may be the same as the radicals represented by R' above, as well as the corresponding halogenated groups such as chloromethyl, 2-bromo-4,6-diiodophenyl, 1,2-difluorovinyl, 3,4-difluorocyclopentyl, 2-bromocyclopentene-2,3-yl and 4-chlorohexyl. The polyalkoxysilanes employed herein include mono-organotrihydrocarbonoxysilanes, tetrahydrocarbonoxysilanes and partial hydrolyzates thereof. Specific examples of alkyl silicates are ethyltrimethoxysilane, methylbutoxydiethoxysilane, propyltripropoxysilane, methyltriethoxysilane, ethyltriethoxysilane, tetraethyl orthosilicate and tetra-n-butyl orthosilicate. Examples of organopolysilicates are ethyl polysilicate, isopropyl polysilicate, butyl polysilicate and partially hydrolyzed ethyl silicates such as ethyl silicate "40" which consists primarily of decaethyltetrasilicate. Examples of polyalkoxysiloxanes are dimethyltetraethoxydisiloxane, trimethylpentabutoxytrisiloxane and the like.

The polyalkoxysilanes and polyalkoxysiloxanes employed herein may be used either alone or in combination. They should be used in an amount of from about 0.5 to about 20 percent and more preferably from about 1 to 10 percent by weight based on the weight of the organopolysiloxane. If the total weight of the polyalkoxysilanes or polyalkoxysiloxanes is below about 0.5 percent based on the weight of the organopolysiloxane, very little cross-linking occurs. If, on the other hand, the total weight of the polyalkoxysilanes or polyalkoxysiloxanes is above about 10 percent based on the weight of the organopolysiloxane, the curing time will not be substantially reduced. However, a large excess of cross-linking agent insures complete reaction with all silicon bonded hydroxyl groups and in addition, acts as a scavenger for any moisture which may be present.

These organopolysiloxane compositions are cured by mixing the hydroxyl-terminated organopolysiloxanes with the polyalkoxysilanes or polyalkoxysiloxanes in the presence of condensation catalysts such as metallic salts of organic carboxylic acids. Examples of suitable acid radicals are those which yield the acetate, the butyrate, the octoate, the laurate, the linoleate, the stearate and the oleate. The metal ion of the metallic salt may consist of lead, tin, zirconium, antimony, iron, cadmium, barium, calcium, titanium, bismuth and manganese. Examples of suitable salts are tin naphthenate, lead octoate, tin octoate, iron stearate, tin oleate, antimony octoate, tin butyrate and the like. Other catalysts which may be used are bis(acetoxybutylphenyltin)oxide, bis(acetoxydibutyltin)oxide, bis(tributyltin)oxide, bis[tris-(o-chlorobenzyl)tin]oxide, dibutoxy dibutyltin, tris-t-butyltin hydroxide, triethyltin hydroxide, diamyldipropoxytin, dibutyltin dilaurate, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride and the like. These catalysts may be dispersed in a solvent and then added to the hydroxyl-terminated organopolysiloxane or they may be dispersed on a suitable filler or additive and thereafter milled with the polymer. Examples of suitable hydrocarbon solvents are benzene, toluene, xylene and the like; halogenated hydrocarbons such as perchloroethylene or chlorobenzene; organic ethers such as diethyl ether, dibutyl ether as well as hydroxyl free fluid polysiloxanes. It is preferred that the solvents be of sufficient volatility to vaporize off at room temperature.

The amount of catalyst used in these curing systems may range from about 0.05 to about 2 percent by weight, preferably from about 0.1 to about 1 percent by weight based on the weight of the composition. A mixture of two or more of the catalysts enumerated above may be used if desired. The amount of catalyst added to the composition is generally determined by the requirements of the particular job, especially the pot-life or working time required.

The silicon nitride particles employed in the composition of this invention are polycrystalline or amorphous materials having an average particle size of from about 0.5 to about 350 microns and more preferably from about 40 to 250 microns. The particle size is not critical as long as the particles are not so large as to be difficult to mix with the organopolysiloxane to form a homogeneous mixture.

The silicon nitride particles may be used with other fillers such as reinforcing fillers, i.e., fillers having a surface area of at least 50 m$^2$/gm. Examples of such fillers are precipitated silicon dioxide having a surface area of at least 50 m$^2$/gm and/or pyrogenically produced silicon dioxide. Examples of other reinforcing fillers are the aerogels, alumina, carbon blacks and graphite.

A portion of the fillers can be semi- or non-reinforcing fillers, i.e., fillers which have a surface area of less than 50 m$^2$/gm. Examples of semi- or non-reinforcing fillers are metal oxides, metal nitrides, glass beads, bubbles or fibers, metallic flakes, powders and fibers such as copper, nickel and aluminum, cork, organic resins, polytetrafluoroethylene, polychlorotrifluoroethylene, polyvinyl chloride, bentonite, diatomaceous earth, crushed quartz, mica, and mixtures thereof. Preferred examples of metal oxide fillers are zinc oxide, ferric oxide, alumina and titanium oxide. The fillers may also be treated with, for example, triorganoalkoxysilanes, such as trimethylethoxysilane to coat the surfaces with organosiloxy groups.

The amount of fillers including silicon nitride particles which may be incorporated in the compositions of this invention is not critical and may vary over a wide range. Thus, the amount of filler including silicon nitride particles may range from about 30 to 95 percent by weight and more preferably from about 40 to 90 percent by weight, based on the weight of the composition, in which at least 10 percent by weight of the filler is silicon nitride particles. More preferably, the amount of silicon nitride particles may range from about 30 to 100 percent by weight based on the weight of the filler. It is, however, preferred that the other fillers employed in the composition not interfere with the thermal conductivity of the resultant composition.

Other additives which can be incorporated in the compositions of this invention include pigments, compression set additives, oxidation inhibitors, plasticizers, adhesion promoters, base stabilizers and other materials commonly employed as additives in the silicone rubber art. Such additives are preferably present in an amount below about 15 percent by weight based on the weight of the composition.

The organopolysiloxane compositions may be compounded in the usual manner for preparing conventional siloxane elastomers. However, when the materials are stored prior to use, it is essential that either the catalyst or the crosslinking agent such as the polyalkoxysilane or polyalkoxysiloxane be stored separately. In other words, the hydroxy-terminated organopolysiloxanes, cross-linking agent, silicon nitride particles and other fillers may be compounded and the catalyst added just prior to use. In another method, the organopolysiloxane, catalyst, silicon nitride particles and other fillers may be compounded and the crosslinking agent added just prior to use. Also, the silicon nitride particles and other fillers may be added either to the hydroxyl-terminated organopolysiloxane or the cross-linking agent prior to the addition of the catalyst or immediately after the reactants have been combined. These compositions cure spontaneously at room temperature upon mixing the ingredients, i.e., the hydroxyl-terminated organopolysiloxane, catalyst, cross-linking agent, silicon nitride particles and other fillers.

The compositions of this invention may be used in many applications where it is necessary or desirable that heat be conducted away from the source. Specific applications where these compositions may be employed are as thermally conductive gaskets, as thermally conductive adhesives and as encapsulating agents for electronic components.

In the following examples all parts and percentages are by weight unless otherwise specified.

EXAMPLE 1

A room temperature vulcanizable composition is prepared by mixing 250 parts of silicon nitride particles, 325 mesh, (available from Afrimet-Indussa, Inc.) with 100 parts of a hydroxyl-terminated polydimethylsiloxane (2000 mPa.s at 25° C.) and 5 parts of an ethyl silicate "40" at a temperature of about 90° C. for 1 hour. The resultant composition has a viscosity of about 54,000 mPa.s at 25° C. About 1.2 parts of dibutyltin butoxy chloride is mixed with the resultant composition. The composition is de-aired, molded into test slabs and then cured for 7 days. The physical properties and the thermal conductive properties are shown in the table.

EXAMPLE 2

The procedure described in Example 1 is repeated except that 100 parts of a hydroxyl-terminated polydimethylsiloxane having a viscosity of 4000 mPa.s at 25° C. is substituted for the polydimethylsiloxane having a viscosity of 2000 mPa.s at 25° C. The resultant composition has a viscosity of about 90,500 mPa.s at 25° C. The physical properties are illustrated in the table.

EXAMPLE 3

A room temperature vulcanizable composition is prepared by mixing 300 parts of silicon nitride particles (325 mesh) with 100 parts of a hydroxyl-terminated polydimethylsiloxane having a viscosity of 4000 mPa.s at 25° C., 34 parts of fumed silica which has been treated with hexamethyldisilazane and 16 parts of a trimethylsiloxy-endblocked polydimethylsiloxane having a viscosity of 100 mPa.s at 25° C. at a temperature of about 90° C. for about 1 hour. About 5 parts of a composition containing about 25 percent by weight of trimethylsiloxy-endblocked polydimethylsiloxane having a viscosity of 100 mPa.s at 25° C., about 45 percent by weight of tetra-n-propylsilicate and 30 percent by weight of dibutyltin diversatate are mixed with the resultant composition. The composition is de-aired, molded into slabs and then cured for 7 days. The physical properties and thermal conductive properties are shown in the table.

TABLE

| Physical Properties | Example 1 | Example 2 | Example 3 |
| --- | --- | --- | --- |
| Durometer, Shore A | 81 | 80 | 76 |
| Tensile strength, psi. | 688 | 722 | 575 |
| Elongation, percent | 63 | 60 | 55 |
| Tear strength, lb./in. | 37 | 41 | 29 |
| Trouser Tear | 4.8 | 5.2 | 4.5 |
| Thermal Conductivity cal · cm.$^{-1}$sec.$^{-1}$ °C.$^{-1}$ (ASTM D-2214) | $9.6 \times 10^{-4}$ | $9.4 \times 10^{-4}$ | $9.0 \times 10^{-4}$ |

EXAMPLE 4

The procedure described in Example 1 is repeated except that 45 parts of silicon nitride particles (325 mesh) and 300 parts of fumed silica are substituted for the 250 parts of silicon nitride particles. The resultant elastomer exhibits desirable physical properties and thermally conductive properties.

EXAMPLE 5

The procedure described in Example 1 is repeated except that 225 parts of silicon nitride particles and 25 parts of nickel flakes are substituted for the 250 parts of silicon nitride particles. The resultant elastomer exhibits desirable physical properties and thermally conductive properties.

What is claimed is:

1. A thermally conductive room temperature vulcanizable organopolysiloxane composition comprising a hydroxyl-terminated organopolysiloxane, from 0.5 to 20 percent by weight based on the weight of the organopolysiloxane of a crosslinking agent selected from the group consisting of polyalkoxysilanes and polyalkoxysiloxanes, a condensation catalyst and from 30 to 95 percent by weight of filler based on the weight of the composition of which from about 30 to 100 percent by weight based on the weight of the filler is silicon nitride particles.

2. The composition of claim 1, wherein the hydroxyl-terminated organopolysiloxane is represented by the formula

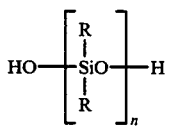

where R is selected from the group consisting of monovalent hydrocarbon radicals and halogenated monovalent hydrocarbon radicals having from 1 to 18 carbon atoms and n is a number such that the viscosity ranges from 5 to 300,000 mPa.s at 25° C.

3. The composition of claim 1, wherein the cross-linking agent is a siloxane of the formula

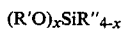

where R' is a monovalent hydrocarbon radical having from 1 to 8 carbon atoms, R" is selected from the group consisting of a monovalent hydrocarbon radical and a halogenated monovalent hydrocarbon radical having from 1 to 8 carbon atoms and x is 3 or 4.

4. The composition of claim 1, wherein the cross-linking agent is a polyalkoxysiloxane in which the silicon atoms are linked through ≡Si—O—Si≡ linkages and the remaining valences of the silicon atoms are satisfied by (R'O) and R" radicals, where R' is a monovalent hydrocarbon radical having from 1 to 8 carbon atoms and R" is selected from the group consisting of a monovalent hydrocarbon radical having from 1 to 8 carbon atoms and halogenated monovalent hydrocarbon radicals having from 1 to 8 carbon atoms.

5. The composition of claim 1, wherein the condensation catalyst is an organic tin compound.

6. The composition of claim 1, wherein the particle size of the silicon nitride ranges from 0.5 to 350 microns.

7. The composition of claim 1, wherein the particle size of the silicon nitride ranges from about 40 to about 250 microns.

8. The composition of claim 2, wherein the hydroxyl-terminated organopolysiloxane is a hydroxyl-terminated poly-dimethylsiloxane.

9. The composition of claim 3, wherein the cross-linking agent, is tetraethyl orthosilicate.

10. The composition of claim 4, wherein the cross-linking agent is ethyl silicate "40".

11. The composition of claim 5, wherein the condensation catalyst is dibutyltin butoxy chloride.

* * * * *